T. BUTLER.
Pump.

No. 166,497. Patented Aug. 10, 1875.

Witnesses
Chas. H. Smith
Harold Serrell

Inventor
Theodore Butler
per Lemuel W. Serrell
Atty

UNITED STATES PATENT OFFICE.

THEODORE BUTLER, OF MELROSE, NEW YORK.

IMPROVEMENT IN PUMPS.

Specification forming part of Letters Patent No. 166,497, dated August 10, 1875; application filed July 12, 1875.

*To all whom it may concern:*

Be it known that I, THEODORE BUTLER, of Melrose, in the county and State of New York, have invented an Improvement in Pumps, of which the following is a specification:

Pumps have been made in which the frame for the cross-head of the piston-rod is attached to the head of the cylinder by bolts, or by a ring-nut around the stuffing-box.

My present invention is made for the purpose of allowing the handle to be positioned at any desired angle relatively to the wall or support against which the pump-cylinder is attached, so that the handle can be placed wherever it is the most convenient for operation. I make use of a frame that is connected to the cylinder-head by a nut around the stuffing-box, and upon this frame is the fulcrum for the lever or handle, and the piston-rod is guided at its upper end by said frame. The lever is forked at the end to pass at both sides of the frame, and of a slotted cross-head containing the actuating roller or pin. The pump-barrel rests in two semicircular or segmental bearings upon the attaching frame, and it is clamped to them by a strap, so that the barrel can be partially turned to bring the delivery-pipe in any desired direction.

Figure 1:
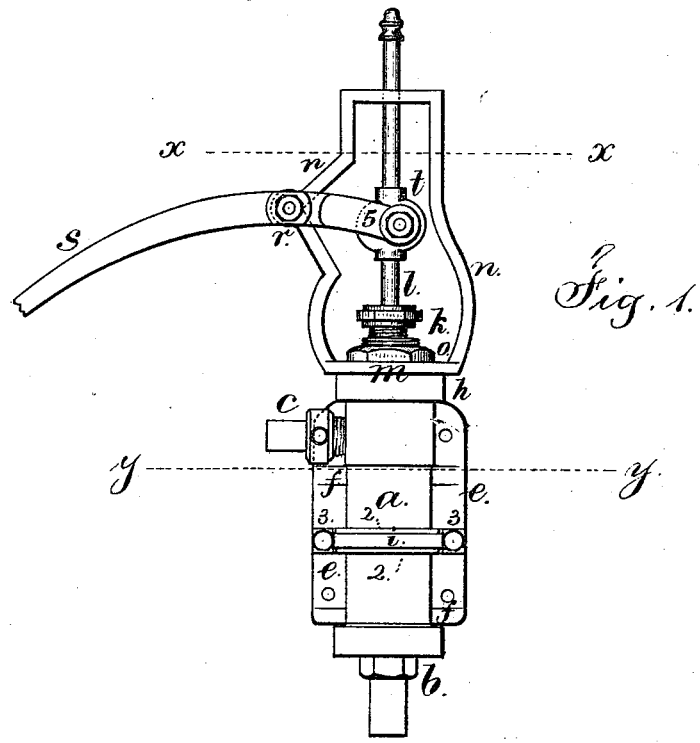
Figure 2:
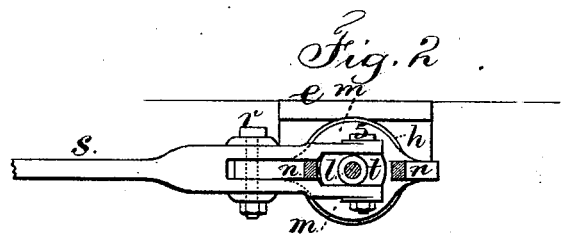
Figure 3:
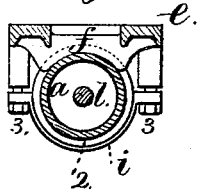

In the drawing, Figure 1 is an elevation of the pump. Fig. 2 is a sectional plan at the line $x\ x$, and Fig. 3 is a sectional plan at the line $y\ y$.

The pump barrel or cylinder $a$ is of any desired character or size, with the coupling-head $b$ at the lower end for the suction-pipe, and with the delivery-pipe and coupling $c$ near the upper end. The interior valves and piston are of ordinary construction. The frame $e$, that serves to sustain the pump, is made with segmental bearings $f$, that fit the exterior of the cylinder, and at the center of the pump there are rings 2 2, between which is placed the clamping-segment $i$, that is bolted at its ends to the frame by the bolts 3. This construction allows the pump to be partially revolved in its bearings and therein firmly clamped, so that the delivery-pipe can stand in any direction to the frame $e$, to conform to the direction in which the water is to be conveyed. The cylinder-head $h$ is made with a gland or stuffing-box, $k$, for the piston-rod $l$, and around this there is the ring-base $m$ of the frame $n$, and said base and frame are held firmly to the cylinder-head by the nut $o$. The frame $n$ serves as a guide for the upper end of the piston-rod $l$, and also sustains the fulcrum $r$ of the handle or lever $s$, and this lever is made as a two-part or forked end, so as to pass at each side of the frame and of the slotted cross-piece $t$ upon the piston-rod $l$, in the slot of which is a roller upon the pin 5, as usual.

I claim as my invention—

1. The pump-barrel $a$, resting in the segmental bearings of the frame $e$, in combination with the segmental strap $i$, bolts 3, and rings 2 upon the pump-barrel, for the purposes and as set forth.

2. The frame $n$, attached to the cylinder-head by the nut $o$ around the stuffing-box, and forming a guide for the upper end of the piston-rod $l$, in combination with the lever $s$, that is attached to such frame by the fulcrum-pin $r$, and is formed with a fork at the end, passing at both sides of the frame and of the cross-piece upon the piston-rod, for the purposes and as set forth.

Signed by me this 9th day of July, 1875.

THEODORE BUTLER.

Witnesses:
 GEO. D. WALKER,
 CHAS. H. SMITH.